Dec. 23, 1958   A. MEIXNER ET AL   2,865,273
PHOTOGRAPHIC CAMERA WITH RETRACTABLE TUBE
Filed Feb. 10, 1955
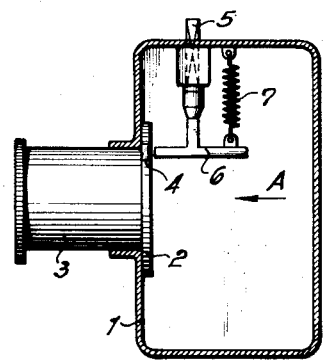
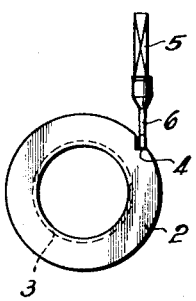
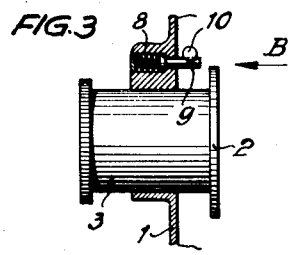
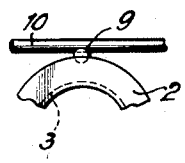
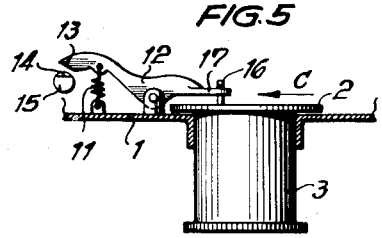
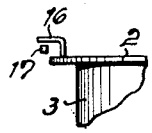
INVENTORS
ALFRED MEIXNER
EWALD GRASHOFF
BY
ATTORNEYS

2,865,273

PHOTOGRAPHIC CAMERA WITH RETRACTABLE TUBE

Alfred Meixner and Ewald Grashoff, Braunschweig, Germany, assignors to Voigtländer Aktiengesellschaft, Braunschweig, Germany, a joint stock company of Germany Application February 10, 1955, Serial No. 487,434

Claims priority, application Germany February 18, 1954

1 Claim. (Cl. 95—39)

The present invention relates to photographic cameras provided with a telescopic tube, in which a release member arranged in the camera body is locked when the tube is not in completely advanced position.

In a known photographic camera, a release member of the objective shutter, which is displaceable together with the tube, is provided with an especially designed extension, which is, on the one hand, permanently operatively connected with the release button and, on the other hand, slides into a bore of the camera body, in retracted position of the tube. Upon advancing the tube, said extension emerges from said bore which has a locking effect, whereupon the shutter can be released. In this construction, the relatively unstable shutter release member, which can be used in only one specific form, is locked and unlocked.

In another known construction, a pin is arranged on the front wall of the camera in such manner that it locks operation of the release handle of the tube, located on the shutter of the tube, in retracted position of the tube. This projecting pin is inconvenient to the user of the camera. This known arrangement can be suitable for cameras with manual operation of the shutter release lever, but would need fundamental change in cameras having a lateral release member.

In a likewise known device, the camera body comprises a swinging lever which is under spring effect and locks the release member of the camera in its rest position. With its other end the lever is located in a bayonet recess near the front wall of the camera casing in such manner, that a bayonet flap causes the lever to swing, upon locking the tube in its advanced position by turning, and thus sets free the release member. The use of this construction is limited to a telescopic tube which is capable of being fastened with a bayonet lock by turning.

The present invention avoids the above mentioned and other disadvantages of the known arrangements. The main object of this invention is to provide a release lock which operates in dependence on the position of the tube, is capable of universal application, i. e. is not limited to specific embodiments of objective shutters or their release members, or to specific constructions of the camera body. Another object of the invention consists in providing a device of particularly simple operation.

In the constructions according to the present invention a rotating movement of the tube, which is indispensable in operating the locking means in many devices, is avoided. This is attained according to the present invention by an arrangement, in which at the rear end of the telescopic tube, at the camera, a stop collar is provided, by the axial movement of which during advancing the tube, the release member proper is locked and unlocked.

This control action takes place directly in a particularly simple case. Thereby the release key is provided at its end at the camera, with a ledge pointing in the direction of guiding the tube. The tube proper is provided at its rear end with a stop collar, which cooperates with the ledge in such manner that it prevents actuation of the release key, when the tube is not completely pulled out.

According to a second embodiment of the invention, a locking pin, which is displaceably arranged in the camera body in the direction of guiding the tube and is forced to a hindmost position by a spring, locks in its rest position by a locking engagement the release key and prevents its actuation. Upon pulling out the tube, the locking pin is displaced, against the effect of its return spring, in the direction of the front side of the camera, to such extent that it frees the release member.

The locking pin can be substituted by a swingable bolt member, which, in its rest position lockingly enters a recess of the release key. Upon pulling out the tube, a projection of the tube comes in contact with the bolt member and puts it out of engagement with the release key.

The appended drawings diagrammatically illustrate some embodiments of the invention to which the invention is not limited.

Figure 1 illustrates in longitudinal sectional view guiding of the tube in a photographic camera, with bolting or locking of the release key; Figure 2 shows the view denoted "A" in Fig. 1, of the release key cooperating with the stop collar of the tube; Figure 3 is a sectional view of the tube guide of a camera with a longitudinally displaceable locking pin; Figure 4 illustrates the view denoted "B" in Figure 3, of the locking pin cooperating with the release key and the tube; Figure 5 is a longitudinal sectional view through the tube guide of a camera, with a bolt lever for locking the release key and Figure 6 illustrates the view denoted "C" of the point of engagement between the tube and the bolt lever.

Referring now to the drawings in detail, in Figure 1 reference numeral 1 denotes the camera body, in which tube 3 (which is shown also in Figure 2) provided with a stop collar 2 is displaceably arranged. Said stop collar 2 is provided on one side with a locking edge 4, opposite to which a ledge 6 connected with a non-rotatable release key 5, stands with slight play. 7 denotes the return spring of release key 5, which permanently urges key 5 to rest position, i. e. to the position, in which it projects from camera body 1. The length of ledge 6 is selected in such manner that release key 5 can be out of engagement with locking edge 4 of member 2 only, if tube 3 is completely pulled out. In all other positions, even if the tube is only slightly retracted, locking edge 4 prevents pushing down of release key 5. Furthermore, tube 3 is prevented from turning by conventional means not shown in the drawing.

In the embodiment shown in Figures 3 and 4, in the front wall of camera body 1, beside tube 3 a locking pin 9 is arranged, which can be pressed against spring 8 by stop collar 2 of the tube, when the tube is pulled out to its foremost position. In its advanced position, this locking pin 9 engages a recess of release key 10, which is in rest position. Stop collar 2 of tube 3 is thereby arranged in such manner that, on the one hand, during its forward movement, it presses back locking pin 9, and, on the other hand it goes with play past the release key.

The device shown in Figures 5 and 6 is similar to that shown in Figures 3 and 4. However, in the embodiment shown in Figs. 5 and 6, the locking pin is substituted by a bolt lever 12, which is under the effect of a return spring 11. In retracted position of tube 3, said lever 12 lockingly enters by its end portion 13 a recess 14 of release key 15. Upon pulling out the tube, a nose or projection 16 provided on the tube comes in engagement with the other end portion 17 of lever 12 and thereby brings end portion 13 out of engagement with release key 15.

It will be understood that this invention is not limited to the specific elements, designs and other details specifically described above and illustrated in the drawings and can be carried out with various modifications without departing from the scope of the invention, as defined in the appended claim.

What is claimed is:

A photographic camera comprising a picture-taking objective and a telescopic tube carrying said objective; said tube having a rest position in the camera casing and a picture-taking position, to which the tube is shifted by axial displacement; a shutter release key displaceably arranged in the camera casing; said tube being provided with a stop collar at its inner end relative to the camera casing, for locking movement of the shutter release key in rest position of the tube and in its positions between said rest position and picture-taking position, and releasing said key in picture-taking position of the tube; the release key being provided with a ledge extending in the direction of the telescopic movement of the tube and the stop collar having a locking edge for locking said ledge until the stop collar comes to abutting position at the wall of the camera.

References Cited in the file of this patent

UNITED STATES PATENTS

| | | |
|---|---|---|
| 1,061,115 | Pickard | May 6, 1913 |
| 2,011,985 | Goldhammer | Aug. 20, 1935 |
| 2,093,282 | Leitz et al. | Sept. 14, 1937 |

FOREIGN PATENTS

| | | |
|---|---|---|
| 644,612 | Germany | May 8, 1937 |
| 472,733 | Italy | June 30, 1952 |